United States Patent

Schenkel

[15] 3,683,120

[45] Aug. 8, 1972

[54] PCM DATA TRANSMISSION SYSTEM

[72] Inventor: Dieter Schenkel, Au/Iller, Germany

[73] Assignee: Licentia Palentt-Verwaltungs-GmbH, Frankfurt am Main, Germany

[22] Filed: Nov. 30, 1970

[21] Appl. No.: 93,682

[30] Foreign Application Priority Data

Nov. 29, 1969 Germany..........P 19 60 077.2

[52] U.S. Cl...................................179/15 A, 178/50

[51] Int. Cl.................................................H04j 1/00

[58] Field of Search..................179/15 A; 178/50, 58

[56] References Cited

UNITED STATES PATENTS

| | | | |
|---|---|---|---|
| 2,835,739 | 5/1958 | Ensink | 179/15 FS |
| 3,082,296 | 3/1963 | Caruthers | 179/15 FS |
| 3,294,913 | 12/1966 | Saraga | 179/15 FS |

*Primary Examiner*—Donald J. Yusko

*Attorney*—Spencer & Kaye

[57] ABSTRACT

An improved pulse code modulation (PCM) data transmission system whose pulse amplitude modulation (PAM) stage contains a sampled data or scanning filter for the analog data which is scanned at a frequency $f_p$ which is a whole number multiple of the frame frequency $f_R$ of the PCM system, and in which quasi four-wire transmission is provided between the PCM system and the connected users or parties without using a four-wire terminating set, whereby only one sampled data filter need be provided both for receiving and transmitting data. According to the invention circuit means are provided for coupling the received transmitted PCM signals, at the scanning frequency $f_p$, to the same sampled data filter utilized to filter the sampled analog signals from the respectively connected users, and further means are provided at the output of the sampled data filter for shifting the center frequency of the carrier-frequency bands utilized for the transmission of data from the PAM stage to the respective connected users so that after further scanning of these carrier-frequency bands at the scanning frequency $f_p$ the resulting frequency bands will not fall into the periodic pass bands of the sampled data filter. If a digital sampled data filter is utilized, the received PCM data signals may be fed directly thereto without decoding. Alternatively, if an analog sampled data filter is utilized, then the received PCM data signals must be decoded into PAM signals before they are fed to the sampled data filter.

8 Claims, 8 Drawing Figures

Inventor:
Dieter Schenkel
BY Spencer & Kaye
ATTORNEYS.

Inventor:
Dieter Schenkel
BY Spencer & Kaye
ATTORNEYS.

Inventor:
Dieter Schenkel
BY Spencer & Kaye
ATTORNEYS.

PCM DATA TRANSMISSION SYSTEM

BACKGROUND OF THE INVENTION

The present invention relates to a PCM transmission system [pulse code modulation] with a frame frequency $f_R$, preferably $f_R = 8$ kHz, whose PAM stage [pulse amplitude modulation] contains sampled data or scanning filters for the data which is sampled at a scanning frequency $f_P$ which is a whole number multiple of the frame frequency $f_R$, and in which a quasi four-wire transmission is provided from the PCM system to the connected users.

The problems inherent in the increased requirement for data transmission capacity have resulted in the development of systems which can meet this requirement with permissible expenditures. In this connection it has been known for a long time to transmit data by time multiplex systems. In one type of such a system, the signals of the individual user, which are initially analog signals, are scanned or sampled as to their amplitude at a scanning frequency $f_A$. The amplitudes of these scanning values are then digitally coded and form a pulse sequence which can easily be transmitted through a transmitting medium in the manner that a plurality of such pulse sequences can be interleaved or inserted in one another without influencing one another. Such a system is usually called a PCM time multiplex system. A prerequisite for the functioning of such a system is a band limitation of the analog signals emitted by the user (low-frequency signals) by means of a low-pass filter. The scanning produces a periodic frequency spectrum in which the low-frequency signal forms sidebands at the multiples of the scanning frequency $n \cdot f_A$ $(n=0, 1, 2, \ldots)$. FIG. 1 shows such a frequency spectrum. These higher frequency sidebands will be called carrier frequency sidebands below.

If now, according to applicant's copending U.S. Pat. Application Ser. No. 14,332, filed Feb. 24th 1970, a carrier-frequency band from the frequency spectrum resulting during scanning is used for the transmission of a signal received from the PAM stage of the PCM system to the user, it is possible to operate a two-wire line in a quasi four-wire operation, since the data signal transmitted by the user to the PAM stage of the PCM system appears as a low-frequency band. FIG. 2a is a schematical representation of such a two-wire connection between users $TL_1$ and $TL_2$. It is here assumed that each user $TL_1$, $TL_2$ emits a low-frequency signal $NF_1$, $NF_2$, respectively, and receives a carrier-frequency signal $TF_2$, $TF_1$, respectively. Each one of the users has associated filters $F_1$ or $F_2$ for the data he transmits or receives, respectively. It is also shown that the PCM portion is constructed of coders and decoders.

It was shown in the above-identified application that with the appropriate use of sampled data filters each individual user connected to the PAM system need no longer have his own associated sampled data filter but rather only as many sampled data filters are provided as is the maximum number of users which would normally be simultaneously transmitting data and the sampled data filters are, by means of proper switching, then associated with only those users who are presently transmitting data. If such sampled data filters are used in the PAM portion of a PCM system, the scanning frequency $f_A$ of the sampled data filters must be selected to be $f_A = f_P$ where $fP$ is a whole number multiple of the PCM frame frequency $f_R$. A series of $f_P/f_R - 1$ of consecutive PAM pulses are suppressed at the output of the sampled data filter so that a PAM pulse sequence with the repetition frequency $f_R$ again appears which sequence is then fed to an amplitude coder. FIG. 2b is a schematic representation of a principal connection in such an arrangement between users $TL_1$ and $TL_2$. Filters $F_1$ and $F_2$ are sampled data filters for the data sampled by means of switches $a_{11}$ and $a_{21}$, respectively, at the scanning frequency $f_P$. $I_1$ and $I_2$ are interpolation circuits which approximate the analog signal from the received PAM pulses provided by the scanning switches $a_{12}$ and $a_{22}$ respectively.

If the transmission from the four-wire line to the two-wire line is to be made without a four-wire terminating set or diplexer, as shown in FIG. 2, i.e. if the output of the interpolation circuit $I_1$ and the input of filter $F_1$ are directly connected together, then the carrier-frequency band selected for the retransmission of the received signal to the user must be shifted in its center frequency, according to a feature of the present invention, so that the signal $TF_1$ after further scanning by switch $a_{21}$ falls into the periodically recurring blocking ranges of the sampled data filter $F_2$ with all the occurring periodic bands and correspondingly the periodic bands fall into the blocking ranges of sampled data filter $F_1$ after $TF_2$ has been scanned by switch $a_{11}$. Frequency converters $FU_1$ and $FU_2$, whose function will be discussed below, serve to accomplish this shift of the center frequency. If this requirement is not met, the illustrated quasi four-wire loop is closed on itself and oscillates. $f_p$ 1 $f_p$. 1 1

FIG. 3 shows this center frequency shift in a schematic representation, each illustrated oblique rise being intended to indicate only the distribution of the high and the low frequencies. Since sidebands are produced at the multiples of scanning frequency $f_p$ when the low-frequency band $NF_1$ according to the upper diagram of FIG. 3, is scanned, the carrier-frequency band or bands TF for the second transmission direction are, therefore, to be represented by sidebands to the odd multiples of one-half the scanning frequency $f_P$ $(m \cdot (f_P)/(2); m = 1, 3, 5, \ldots)$. In other words, with this arrangement, the output value, for example, of interpolator $I_1$ is fed to the input of sampled data filter $F_1$ with such a frequency position that filter $F_1$ completely blocks this signal $TF_2$ and vice versa. The realization of such a frequency band shift can be accomplished by alternatingly changing the polarity of the PAM pulses or by suppressing every other PAM pulse if this reduced pulse sequence is fed to a sampled data filter which exhibits periodic passing regions at the odd multiples of $(f_P)/(2)$.

The alternate changing of the polarity can be accomplished by alternatingly feeding the PAM pulses to the direct and to the inverted input terminal of an operational amplifier through a switch, which is switched from one input terminal to the other in the middle between the first and the second PAM pulse, in the middle between the second and the third PAM pulse, etc. Referring to FIG. 5, the switch in the frequency converter $FU_1$ (if $FU_1$ is constructed as above described) is switched always in the middle between the PAM pulses which are fed to the frequency converter $FU_1$ via switch $b_{14}$.

The realization of sampled data filters of the above-described type is possible by constructing them of either analog or digital modules. In the latter case, an analog-digital converter and a digital-analog converter are connected ahead and behind the actual sampled data filter, respectively. In the former case, the shift register chains of the sampled data filter consist substantially of capacitors and discharge switches. Examples of each type of sampled data filter which are well known in the art are disclosed in the above-identified copending application.

In the considerations thus far set out, it was assumed, for reasons of simplicity, that the sampled data filters are constructed as analog modules. This assumption is to be continued for the discussions below. The PCM signals to be transmitted to the user must then be demodulated before they are fed to the frequency converters FU and interpolators I so that they again appear as PAM signals.

If the PAM stage of the PCM system is used as a time multiplex exchange system, where, for example, two users are connected which are using the same PAM stage of the PCM system so that their data are not pulse code modulated, then the preceeding discussions are valid. However, if one group of data is pulse code modulated, i.e. arrives as a PCM signal, then the carrier-frequency band leading to the user must likewise be so selected that it falls into the blocking ranges of the sampled data filter after further scanning at the scanning frequency $f_p$.

In this case, no frequency shift would be necessary because of the frame frequency $f_R = 8$ kHz, which is generally employed in PCM networks or systems, and the sidebands which are then at multiples of $f_R$ and which, as can be seen in FIG. 4*b*, lie closely together. Rather the desired band must only be selected from the total spectrum, for example by means of a sampled data filter which has pass ranges about the odd multiple of $(f_p)/(a1)$. This leads to difficulties, however, in some individual cases.

Additionally, if $f_p$ is selected to be 24 kHz(FIG. 4*a*), then with reference to frequency $(f_p)/(2) = 12$ kHz, the sidebands of the decoded PCM pulses ($f_R = 8$ kHz) exhibit signal bands in reversed position, as shown in FIG. 4*b*. If $f_p$ were alternatively selected to be 16 kHz, these errors would not occur but the bands would then lie so closely together that accurate separation between low-frequency band and carrier-frequency band could no longer be realized with simple means at the user's end.

SUMMARY OF THE INVENTION

It is the object of the present invention to circumvent the above-mentioned difficulties and simultaneously avoid the use of the above-mentioned additional sampled data filter with passing ranges around the odd multiple of frequency $(f_p)/(2)$.

The above and other objects are achieved according to the present invention in that in a pulse code modulated (PCM) transmission system with a frame frequency $f_R$ in which a quasi four-wire transmission without a four-wire terminating set is provided between the PCM system and the connected users or parties, and whose pulse amplitude modulation (PAM) stage contains sampled data or scanning filters for the analog data which is scanned at a frequency $f_p$ which is a whole number multiple of the frame frequency $f_R$, circuit means are provided for coupling the received transmitted PCM signals to the sampled data filter operating at the scanning frequency $f_p$ which is utilized to filter the sampled analog signals stemming from the respective connected users, and means are provided for shifting the center frequency of the carrier-frequency bands provided at the output of said sampled data filter for the transmission of data from the PAM stage to the respective connected user so that after further scanning of these carrier-frequency bands with the same scanning frequency $f_p$ the resulting frequency bands will not fall into the periodic pass bands of said sampled data filter, whereby only one sampled data filter need be used both for transmitting and receiving the data. If a digital sampled data filter is utilized then the received PCM data need not be decoded but may be fed directly thereto. Conversely, if an analog sampled data filter is utilized then the PCM signals must be decoded into PAM signals before they are fed to the sampled data filter.

DESCRIPTION OF THE PREFERRED EMBODIMENTS

Figure 1:
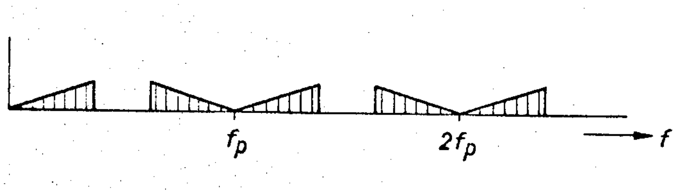
FIG. 1 is a schematic diagram of the frequency spectrum resulting from the scanning of the analog or low-frequency data to be transmitted.
Figures 2A, 2B:
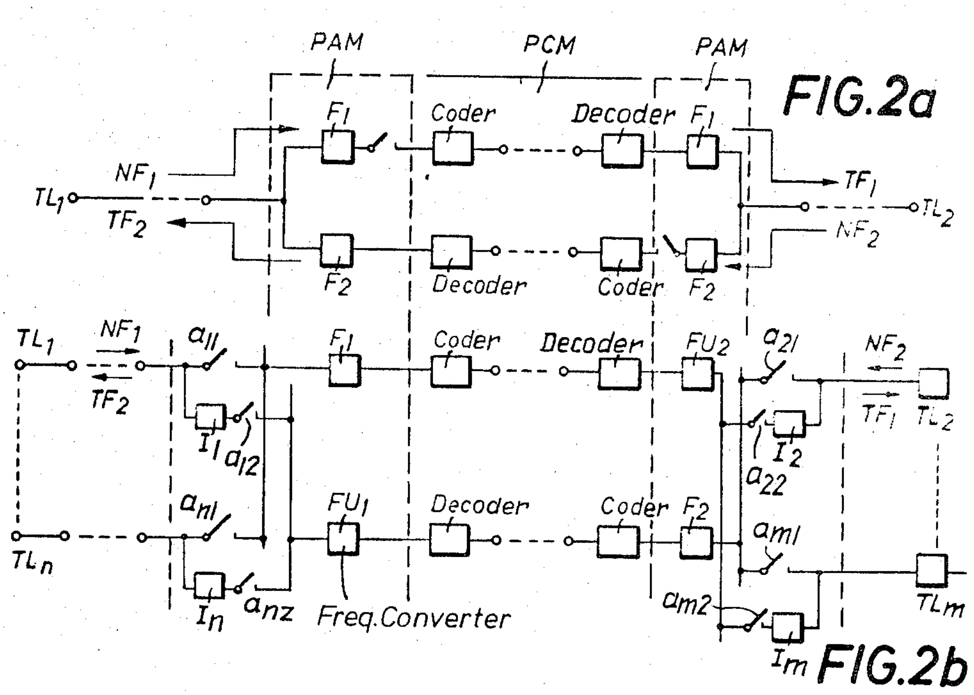
FIGS. 2*a* and 2*b* are schematic representations of pulse code modulated systems of the type to which the present invention is directed.
Figure 3:
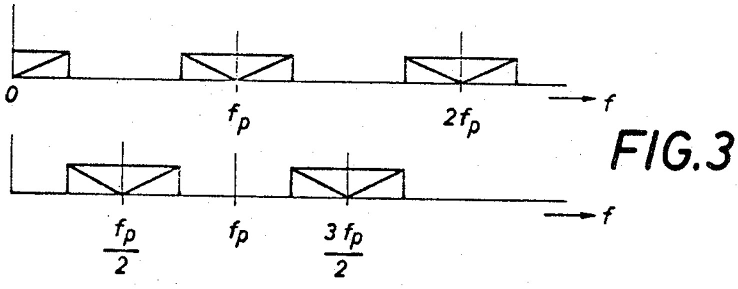
FIG. 3 is a schematic representation of the center frequency shift required for the received PCM signals according to a feature of the invention.
Figure 4:
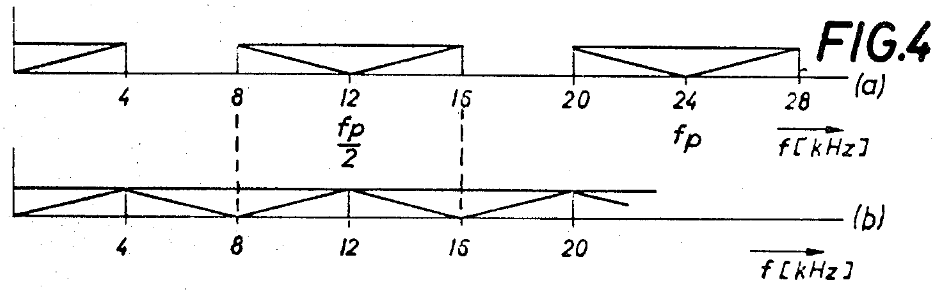
FIGS. 4*a* and 4*b* are schematic representations of the frequency spectrum with a frame frequency $f_R = 8$ kHz and a scanning frequency $f_p = 24$ kHz, respectively.
Figure 5:
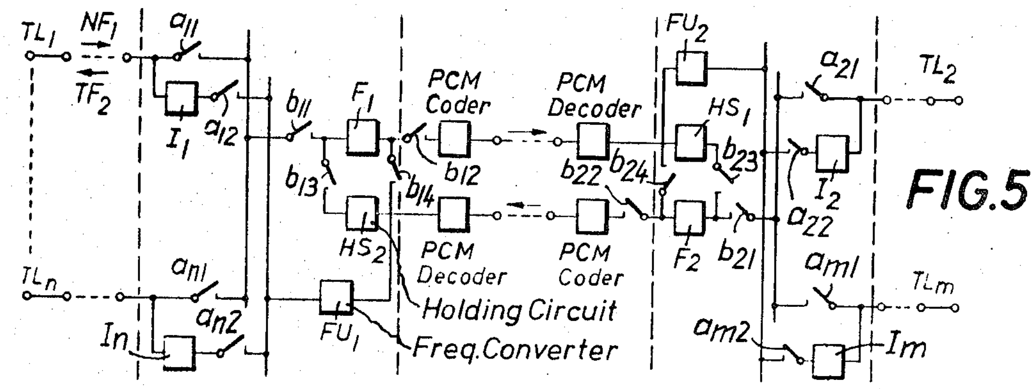
FIG. 5 is a schematic representation of a PCM transmission system according to the invention.

Referring now to FIG. 5, wherein units similar to those shown in FIG. 2 are indicated with the same reference numerals, there is shown a four-wire PCM transmission system, which according to the invention and as with the system shown in FIG. 2*b* does not require a conventional four-wire terminating set, for transmitting and receiving data between users or parties $TL_1$-$TL_p$ and $TL_2$-$TL_m$. As is conventional in such systems the data to be transmitted via the PCM system is encoded in a PCM coder at the transmitting station and decoded in a PCM decoder at the receiving station. As is further conventional in such systems, the data to be encoded comprises PAM signals produced by the scanning of the analog signals emitted by the various users by means of a PAM stage which also serves to transmit the received decoded PCM data signals to the ultimate user.

In the PAM stage, as with the embodiment of FIG. 2*b*, the scanning of the analog (low-frequency) data to be transmitted is performed by the periodic closing of switches $a_{11}$–$a_{n1}$ and $a_{21}$–$a_{m1}$ for the parties $TL_1$–$TL_p$ and $TL_2$–$TL_m$, respectively. Similarly, the scanning of the PAM signal representing the received data is provided by the periodic closing of switches $a_{12}$–$a_{n2}$ and $a_{22}$–$a_{m2}$ for the parties $TL_1$–$TL_n$ and $TL_2$–$TL_m$, respectively. Each of the scanning switches $a_{12}$–$a_{n2}$ and $a_{22}$–$a_{m2}$ is connected to its associated user via an interpolator $I_1$–$I_n$ and $I_2$–$I_m$, respectively, which, in a known manner, smooths and thus reconstructs the analog signal from the scanned PAM pulses. In the illustrated system all of these scanning switches are operating at a scanning frequency $f_p$ which is a whole number multiple of the frame frequency $f_R$ of the PCM system.

Each of the PAM stages is provided with a sampled data filter, $F_1$ or $F_2$, which may either be an analog filter or a digital filter (including analog-digital and digital-analog converters at the input and output, respectively), having periodic pass bands at $nf_p$ when $n$ is a whole number. Each of the filters $F_1$ and $F_2$ is provided with a pair of scanning switches $b_{11}$, $b_{12}$,and $b_{21}$, $b_{22}$, respectively, for connecting the sampled data filter between its respectively associated group of low-frequency scanning switches $a_{11}$–$a_{n1}$ or $a_{21}$–$a_{m1}$ and its associated PCM coder. Similarly, each of the sampled data filters $F_1$ and $F_2$ is provided with a further pair of scanning switches $b_{13}$, $b_{14}$ and $b_{23}$, $b_{24}$, respectively, for connecting the sampled data filter between the output of the associated PCM decoder and its respectively associated group of carrier-frequency scanning switches $a_{12}$–$a_{n2}$ or $a_{22}$–$a_{m2}$.

In order to prevent the data appearing at the output of the interpolators $I_1$–$I_n$ and $I_2$–$I_m$ from being passed through the filters $F_1$ and $F_2$, respectively, upon the closing of the associated low-frequency sampling switch $a_{11}$–$a_{n1}$ or $a_{21}$–$a_{m1}$, a frequency converter $FU_1$ or $FU_2$ is connected between filter switch $b_{14}$ and carrier-frequency sampling switches $a_{12}$–$a_{n2}$ and between filter switch $b_{24}$ and carrier-frequency sampling switches $a_{22}$–$a_{m2}$, respectively. The frequency converters $FU_1$ and $FU_2$, in a manner well known, shift the center frequency of the carrier-frequency bands of the PAM signals at the output of the filters $F_1$ and $F_2$, respectively, so that after further scanning at the frequency $f_p$ by the carrier-frequency sampling switches $a_{12}$–$a_{n2}$ or $a_{22}$–$a_{m2}$, the resulting bands will not fall into the periodic passage bands or ranges of the associated sampled data filter and will thus be blocked thereby. That is,the frequency converters $FU_1$ and $FU_2$ shift the center frequency of the carrier-frequency bands appearing at the output of the associated filters into the position around $(m \cdot f_p)/(2)$ where $m$ is an odd whole number.

If an exchange of information is to take place, for example, between parties $TL_1$ and $TL_2$ in the appropriate time slot associated with party $TL_1$ the switches $a_{11}$, $b_{11}$and $b_{12}$ are all closed so as to sample the low-frequency or analog data emitted by $TL_1$ and connect it via the sampled data filter $F_1$to the PCM coder which in turn transmits the PCM signals via a given transmission medium to the PCM decoder. The PCM decoder reconverts the PCM signals to PAM signals which, by means of the closing of the switches $b_{23}$, $b_{24}$ and $a_{22}$ in the associated time slot, are filtered by the filter $F_2$, shifted in center frequency by converter $FU_2$, smoothed by the interpolator $I_2$ and fed to the party $TL_2$. The reverse connection between party $TL_2$ and party $TL_1$ is similarly made in a different time slot utilizing filter $F_2$ for filtering the analog or low-frequency sampled data from $TL_2$ to be encoded and filter $F_1$ for filtering the carrier-frequency band decoded signals. Thus, only a single sampled data filter $F_1$ or $F_2$ need be provided in each PAM stage for receiving and transmitting data from and to the PCM system.

The PAM pulses appearing at the output of the coder with frequency $f_R$, i.e. the decoded PCM pulses, are scanned, according to the present invention, with the frequency $f_p = n \cdot f_R$ ($n$ is a whole number). Since it must always be assured that each PAM pulse is read by the sampled data filter $F_1$ or $F_2$, the time requirements which must here be maintained are relatively strict. It is, therefore, probable in practice that delay effects will limit adherence to these requirements. This can be overcome, according to a further provision of the present invention in that the received PAM pulses to be processed are fed to a holding circuit $HS_1$ or $HS_2$ as shown in FIG. 5, which holds them until they have been read by the sampled data filter $F_2$ or $F_1$, respectively. Since $f_p$ is a whole number multiple of $f_R$, the value 0 is taken into the scanning filter for $(f_p)/(f_R) - 1$ scanning pulses, because at these moments no PAM pulse is present.

A holding circuit is an element known in the art; for example see "Electronic Engineering", June 1968, p. 342 – 344. FIGS. 6*a* – *k* illustrate the relative conductive and non-conductive timing positions for the various switches shown in FIG. 5. FIGS. 6*a* – *c* are valid for an information flow from the user $TL_1$ to the user $TL_n$, while FIGS. 6*d* – *k* are valid for an information flow from the user $TL_1$ to the user $TL_2$. FIGS. 6*a* shows that for an information flow from user $TL_1$ to user $TL_n$ the switches $a_{11}$, $b_{11}$, $b_{14}$ and $a_{n2}$ must be conductive at the time, i.e., in a special time slot. The information (audio frequency $NF_1$) coming from the user $TL_1$ (in FIG. 6*b* indicated by a dashed line) is scanned by the switch $a_{11}$, the scanning frequency is $f_p$; this scanned information (in FIG. 6*b* indicated by the pulses) is fed to the input terminal of the sampled data filter $F_1$. The output terminal of filter $F_1$ is connected to the input terminal of the frequency converter $FU_1$, which shifts the center frequency of the frequency bands fed to its input terminal. The PCM part of the arrangement of FIG. 5 is not used for the connection between the users $TL_1$ and $TL_n$.

For an information flow from the user $TL_1$ to the user $TL_2$ the information $NF_1$ is scanned as above described and fed to the input terminal of filter $F_1$ (FIG. 6*d*). The output terminal of filter $F_1$ is connected to the input terminal of the PCM coder via the switch $b_{12}$ with the frequency $f_R$ so that every third pulse coming from filter $F_1$ is transferred to the PCM coder (FIG. 6*e*). The PCM is transmitted to the PCM decoder, which decodes the PCM to PAM; the PAM pulses are fed to the holding circuit $HS_1$ (FIG. 6*f*), the pulses in FIG. 6*f* indicate the input of holding circuit $HS_1$, the dashed line indicates the output of holding circuit $HS_1$. The distance between the first pulse of FIG. 6*e* and the first pulse of FIG. 6*f* indicates the delay time of the PCM system. The output of holding circuit $HS_1$ is scanned by the switch $b_{23}$ with the frequency $f_R$ (FIG. 6g) and fed to the scampled data filter $F_2$. FIG. 6h shows the PAM pulses fed to filter $F_2$. When the switch $b_{23}$ is conductive, the switch $b_{21}$ must not be conductive. The distance between the first pulse of FIG. 6f and the first pulse of FIG. 6g depends on which time slot is coordinated to the user $TL_2$ for the reception of information. FIG. 6i shows the time of conductance of the switch $b_{24}$, which feeds the output of filter $F_2$ (shown in FIG. 6k) to frequency converter $FU_2$. The switch $a_{22}$ is conductive at the same times as the switch $b_{24}$.

The above comments were based, for reasons of simplicity, on the fact that the scanning filter consists of analog components. However, the same considerations also apply for digital sampled data filters, although the PCM pulses then need not be decoded but are fed directly to the input of the digital sampled data filter $F_1$ or $F_2$ in their original digital form, i.e. the data is fed in, if required, behind the analog-digital converter. The condition here also being applicable that a PCM word, i.e. the signal sequence corresponding to a coded PAM signal, remain stored until it has been read into the scanning filter. The described inversion of every other PAM pulse at the output of the scanning filter can be provided for a digital filter by changing the bits marking the sign or subsequent to the digital-analog conversion.

Figure 6:
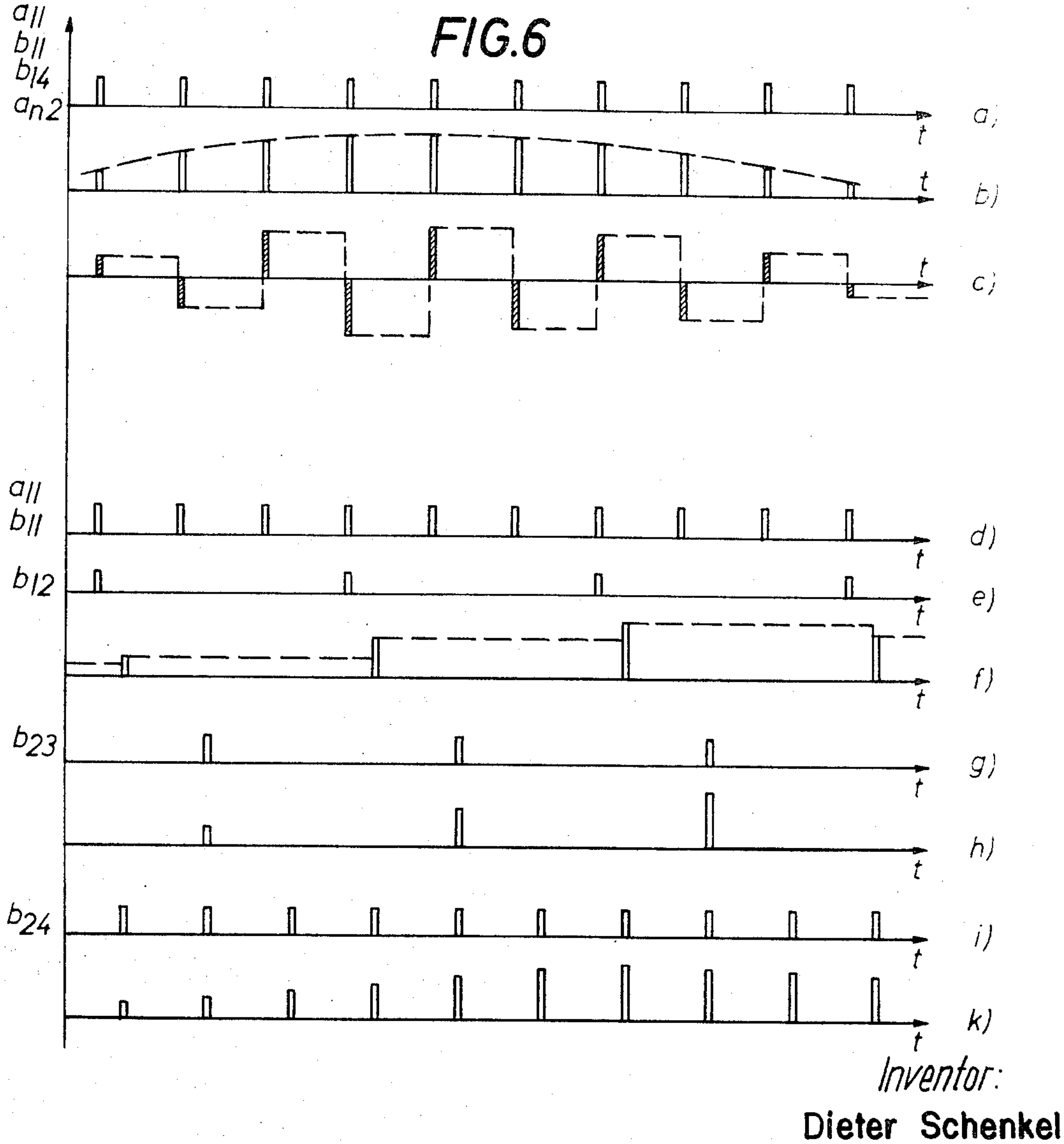
FIG. 6*a* – 6*k* are a schematic representation of the relative opened and closed timing positions of the switches in FIG. 5.
Figure 7:
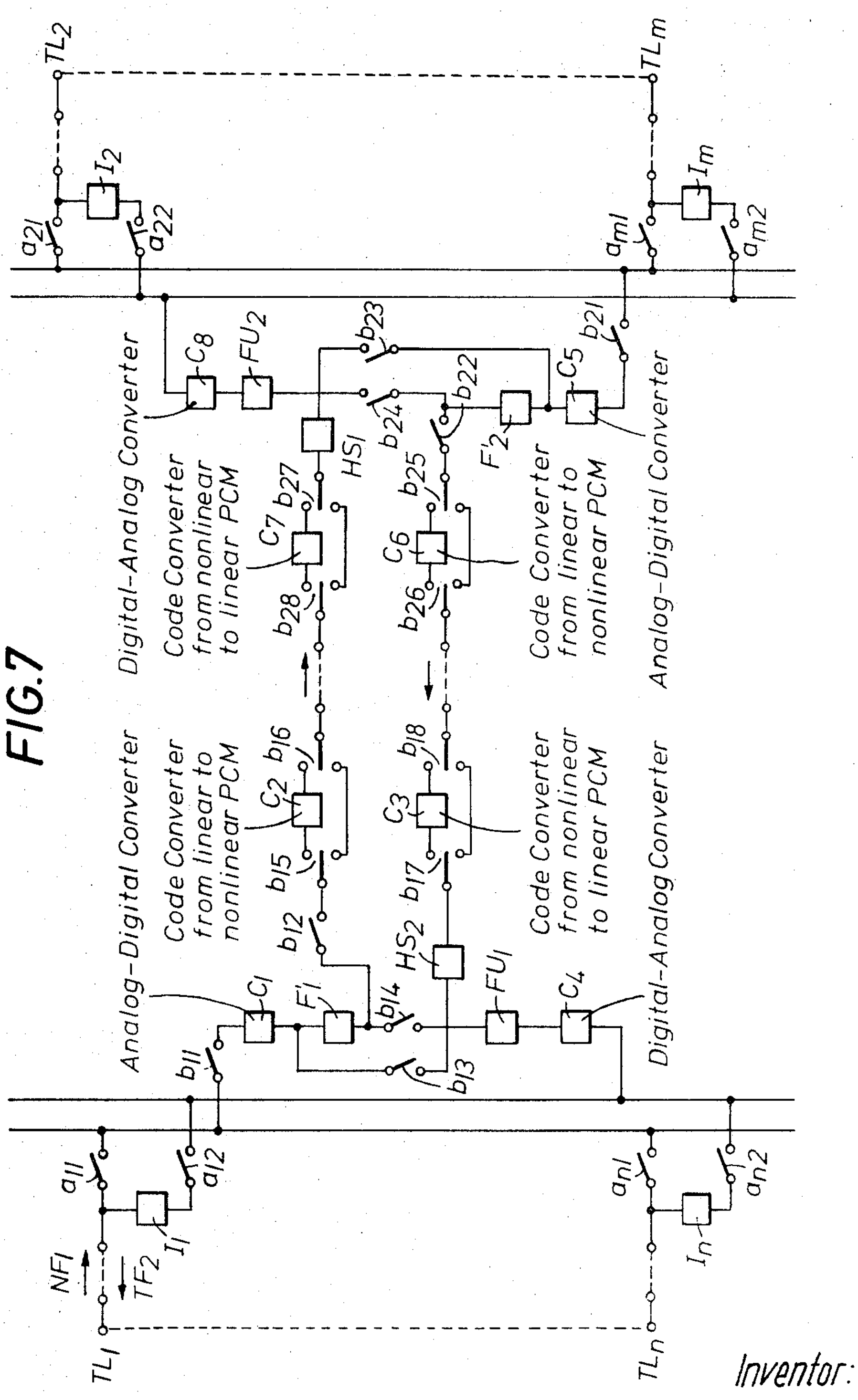
FIG. 7 is a schematic representation of a further PCM transmission system according to the invention.

Two further embodiments of the invention are described by the aid of FIG. 7. The arrangement of FIG. 7 differs from that of FIG. 5 in some parts: FIG. 7 does not include PCM coders and decoders. Additionally to FIG. 5, FIG. 7 shows analog-digital-converters $C_1$ and $C_5$, converter $C_1$ being inverted at the input terminal of the digital sampled data filter $F'_1$(the analog sampled data filter $F_1$ of FIG. 5 is replaced by the digital sampled data filter $F'_1$in FIG. 7). Converter $C_5$ has been inserted at the input terminal of the digital sampled data filter $F'_2$, which replaces filter $F_2$ of FIG. 5. Digital-analog-converters $C_4$ and $C_8$ are connected to the output terminals of frequency converter $FU_1$ and $FU_2$, respectively. In FIG. 7, there can be seen switches $b_{15}$, $b_{16}$, $b_{17}$, $b_{18}$, $b_{25}$, $b_{26}$, $b_{27}$, $b_{28}$,code converters from linear to non-linear PCM $C_2$, $C_6$, and code converters from non-linear to linear PCM $C_3$, $C_7$. When the switches $b_{15} - b_{18}$, $b_{25} - b_{28}$ are in their lower positions, the system works as follows: For an information flow from user $TL_1$ to user $TL_2$ the information coming from user $TL_1$ is scanned by switch $a_{11}$ and fed to the analog-digital converted $C_1$ by switch $b_{11}$. The data are fed to filter $F'_1$ and the data coming from the output terminal of filter $F'_1$ are transmitted directly to the holding circuit $HS_1$, the output of which is scanned by switch $b_{23}$, filtered by filter $F'_2$ and fed via switch $b_{24}$ and frequency converter $FU_2$ to the digital-analog-converter $C_8$. The output of converter $C_8$ is fed via switch $a_{22}$ and interpolator $I_2$ to the user $TL_2$. The relative opened and closed timing positions for the various switches of FIG. 7 can be determined from FIG. 6, the description of which is valid for FIG. 7, too. FIG. 6 is also valid for an information flow from the user $TL_1$ to the user $TL_n$. If the switches $b_1 - b_{18}$, $b_{25} - b_{28}$ are in their upper positions, the linear PCM which is fed by the switch $b_{12}$ to the input terminal of code converter $C_2$, is converted to a non-linear PCM, and on the other side converted to linear PCM again by means of the code converter $C_7$. The advantage of a non-linear PCM is a reduction of bandwidth required for a well understandable transmission of spoken word.

It should be understood, that a system according to FIG. 7 needs not include both the only linear and the non-linear information transmission, for FIG. 7 serves especially for the description of two embodiments of the invention, which are similar.

Since the only digital scanning filters known thus far are intended for linearly coded signals, processing of PCM signals which are non-linearly coded requires a code converter to be connected ahead of the digital filter which converts the non-linear code to a linear code.

A modification of the transmission process according to the invention provides that the PAM stage be operated as an independent time multiplex exchange system.

Figure 8:
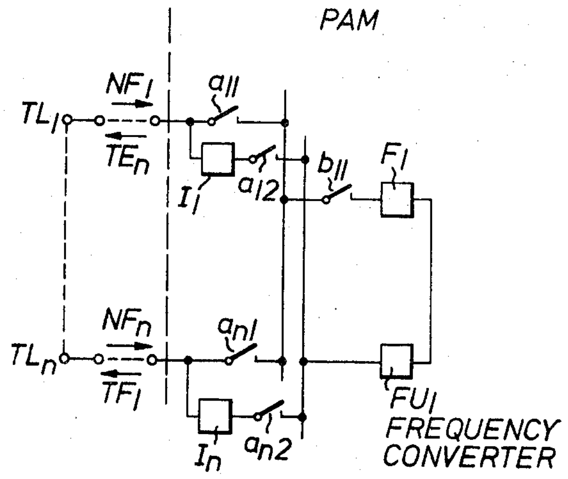
FIG. 8 is a schematic representation of another transmission system according to the invention.

FIG. 8 shows an independent time multiplex exchange system, which can be achieved from the arrangement of FIG. 5 by removing the PCM part and one PAM part (in this example the right-hand PAM part is removed). The switch $b_{14}$ of FIG. 5 is replaced by a direct connection between filter $F_1$ and frequency converter $FU_1$. The switch $b_{13}$ and the holding circuit $HS_2$ are removed, too. The function of this system is the same as was described with the aid of FIGS. 6a – c. The system of FIG. 5 can work as one or two systems according to FIG. 8, when the switches $b_{12}$ and $b_{13}$ are non-conductive, and switch $b_{14}$ is conductive, and when, if required, switches $b_{22}$ and $b_{23}$ are non-conductive, and switch $b_{24}$ is conductive.

It will be understood that the above description of the present invention is susceptible to various modifications, changes and adaptations, and the same are intended to be comprehended within the meaning and range of equivalents of the appended claims.

What is claimed is:

1. In a pulse code modulation (PCM) data transmission system whose pulse amplitude modulation (PAM) stage contains a sampled data filter for the analog data scanned at a frequency $f_p$ which is a whole number multiple of the frame frequency $f_R$ of the PCM system, and in which quasi four-wire transmission is provided between the PCM system and the connected users without using a four-wire terminating set, the improvement wherein circuit means are provided for coupling the received PCM data signals, at the scanning frequency $f_p$, to the same sampled data filter utilized to filter the sampled analog signals from the respectively connected users, and further means are provided at the output of the sampled data filter for shifting the center frequency of the carrier-frequency bands utilized for the transmission of received data from the PAM stage to the respective connected users so that after further scanning of these carrier-frequency bands at the scanning frequency $f_p$ the resulting frequency bands will not fall into the periodic pass bands of the sampled data filter, whereby only one sampled data filter need be provided both for receiving and transmitting data.

2. The PCM transmission system as defined in claim 1 wherein said sampled data filter has periodic pass bands at $n \cdot f_p$ where $n$ is a whole number and wherein said means for shifting the center frequency shifts the center frequency of the carrier-frequency bands so that they are disposed around $(mf_p)/(2)$ where $m$ is an odd whole number.

3. The PCM transmission system as defined in claim 1 wherein said sampled data filter is an analog filter and wherein said circuit means for coupling the received PCM data signals to the sampled data filter includes means for decoding the PCM signals to PAM signals.

4. The PCM transmission system as defined in claim 1 wherein said sampled data filter is a digital filter and wherein said circuit means for coupling the received PCM data signals to the sampled data filter couples the received digital PCM signals to the digital input of the sampled data filter.

5. The PCM transmission system as defined in claim 3 wherein said circuit means for coupling the received PCM data signals to the sampled data filter includes a holding circuit connected between the output of the decoding means and the input of the sampled data filter for storing the decoded PCM signals until they have been read exactly once by said filter.

6. The PCM transmission system as defined in claim 4 wherein said circuit means for coupling the received PCM data signals to the sampled data filter includes a holding circuit connected to the input of the sampled data filter for storing the received PCM signals until they have been read exactly once by said filter.

7. The PCM transmission system as defined in claim 4 wherein the PCM signals are coded according to a non-linear code, and wherein said circuit means for coupling the received PCM data signals to the sampled data filter includes means for converting the non-linear code to a linear code.

8. The PCM transmission system as defined in claim 1 wherein said PAM stage is used as an independent time multiplex exchange system.

* * * * *

UNITED STATES PATENT OFFICE
CERTIFICATE OF CORRECTION

Patent No. 3,683,120 Dated August 8th, 1972

Inventor(s) Dieter Schenkel

It is certified that error appears in the above-identified patent and that said Letters Patent are hereby corrected as shown below:

In the heading of the patent, line 2, change "Au/Iller" to --Ay/Iller--; line 3, change "Palentt" to --Patent--. Column 1, line 9, change "$f_P$" to --$f_p$--; line 67, change "fP" to --$f_p$--.

Column 4, line 58, change "$TL_p$" to --$TL_n$--.

Column 5, line 4, change "$TL_p$" to --$TL_n$--.

Column 7, line 51, after "The" insert --digitalized--; line 63, change "$b_1 - b_{18}$" to --$b_{15} - b_{18}$--.

Signed and sealed this 6th day of February 1973.

(SEAL)
Attest:

EDWARD M.FLETCHER,JR.
Attesting Officer

ROBERT GOTTSCHALK
Commissioner of Patents